Jan. 3, 1967  L. K. JENSEN ETAL  3,295,379
SPHERICALLY SYMMETRIC GYRO
Filed May 20, 1963  3 Sheets-Sheet 1

LOUIS K. JENSEN
GEORGE H. TOWNER
INVENTORS

BY
AGENT

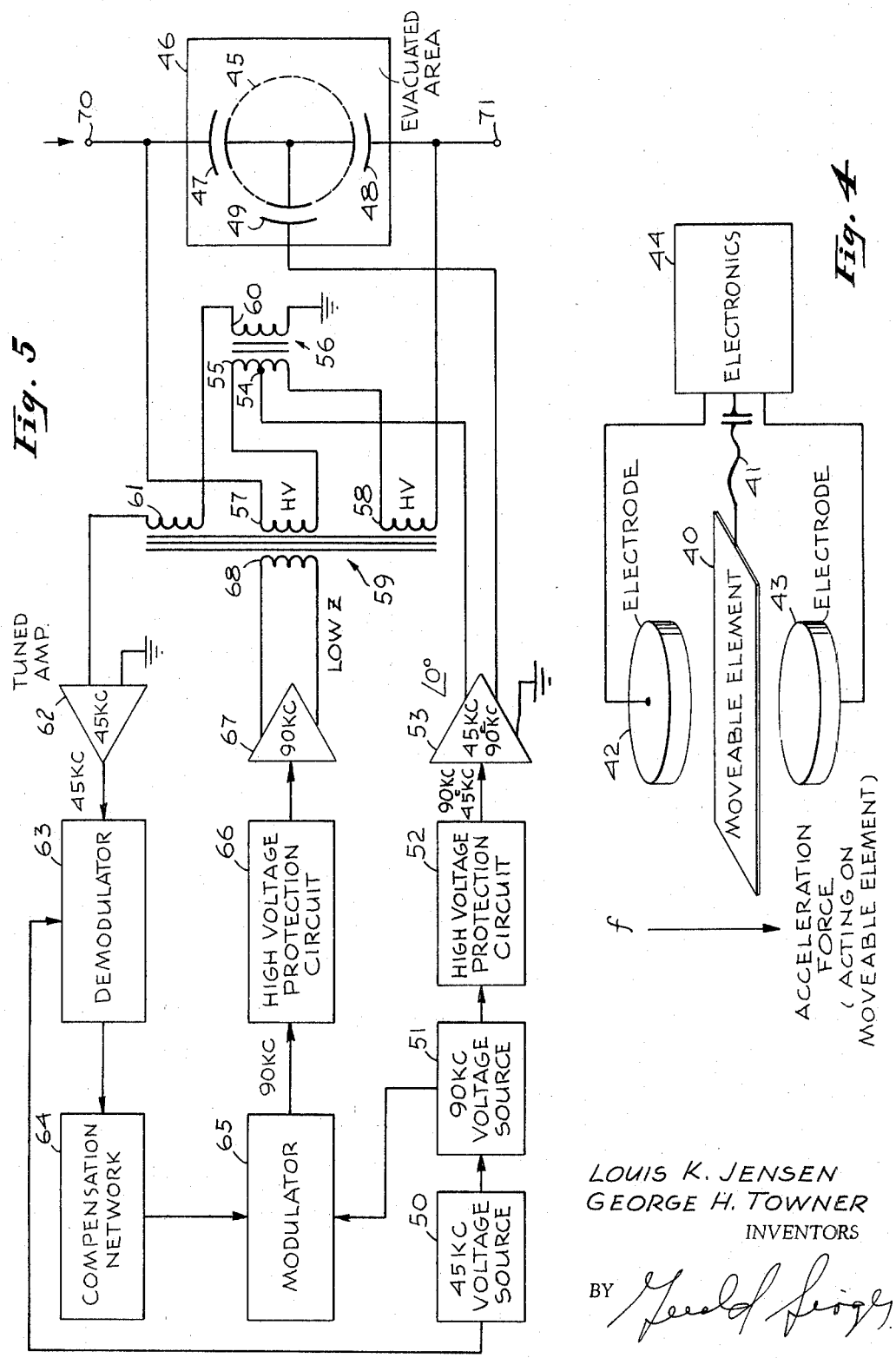

Jan. 3, 1967  L. K. JENSEN ETAL  3,295,379
SPHERICALLY SYMMETRIC GYRO

Filed May 20, 1963  3 Sheets-Sheet 3

$V_r$ = ROTOR VOLTS
$V_b$ = BIAS ~ 45 KC
$V_s$ = ERROR SIGNAL ~ 90 KC $$V_r = \frac{V_{b1} \angle 0°}{3} + \frac{V_{b2} \angle 120°}{3} + \frac{V_{b3} \angle 240°}{3} = 0$$

LOUIS K. JENSEN
GEORGE H. TOWNER
INVENTORS

BY *Gerold George*

AGENT

United States Patent Office 3,295,379
Patented Jan. 3, 1967

3,295,379
SPHERICALLY SYMMETRIC GYRO
Louis K. Jensen, Palos Verdes Estates, and George H. Towner, Palos Verdes, Calif., assignors, by mesne assignments, to TRW Inc., a corporation of Ohio
Filed May 20, 1963, Ser. No. 281,720
12 Claims. (Cl. 74—5.6)

This invention relates to a positional angle readout transducer and more particularly to a simple electromagnetic device for accurately determining the spin axis of a spherically shaped rotating member having no preferred moment of inertia. This invention is an improvement over copending application Serial No. 281,719, filed May 20, 1963, and assigned to same common assignee.

In the general field of rotational equipment, there is a great need for accurately determining and locating the spin axis of a rotating element. For example, in the gyroscope field an output signal representative of the deviation between the spin axis of the roatting gyro and the support or reference mechanism is used as an indication of direction and position. In order to achieve a meaningful output signal, it is necessary to accurately determine and measure the position of the spin reference axis of the gyro. In the prior art this has been accomplished by restraining devices such as potentiometers, microsyn generators and other readout devices physically attached to the rotating gyro member. Optical techniques cooperating with prealigned marks on rotating gyros have also been used where physical restraints were considered objectionable. All previous precision gyros have involved angular pick-off readout systems requiring some sort of reference marks, surfaces, or more complex structures on the rotor or rotor gimbals involving reference marks or elements precisely aligned with the rotor spin axis. Even if precise alignment is not necessary, the pick-offs require that the rotor possess a well defined spin axis, that is, an axis of symmetry about which the moment of inertia is larger than for any other axis of the rotor. In other words, the rotor is required to be dynamically balanced and stable about the chosen spin axis and in addition, statically balanced about the center of support. These requirements comprise constraints which the rotor must satisfy simultaneously, thus complicating the rotor fabrication problem and limiting the precision practically attainable in the gyro.

In this invention, a simple electromagnetic device which is free of all mechanical connections and markings whether they be electrical or optical is disclosed for accurately determining the spin reference axis of the rotating spherical mass having no preferred moment of inertia. The need for precise reference marks and alignment of these marks on the spherical rotor is eliminated, as is the need for a spherical shaping and dynamic balancing of the rotor. The only requirement is that the spherical gyro rotor be statically balanced about the center of support. In other words the spherical gyro rotor should have no preferred moment of inertia. In this specification all reference to a spherical shaped object is defined and used as an object having no preferred moment of inertia. This feature eliminates a major complication in the design of most conventional gyro rotors which is the requirement that the rotor have a larger moment of inertia about one axis than about the two orthogonal axes so that the axis about which the rotor spins is clearly defined. This complicates manufacturing of the rotor by requiring that (1) either a hollow sphere be used with an inertia ring inside the sphere, or
(2) that the sphere be constructed with a ring of dense material laminated into the rotor, or
(3) that some shaping of the sphere be effected. The spherical rotor which may be a solid rotor exhibits the advantages of extreme stability and simplicity, and eliminates the need for markings on the rotor and specialized precision machining of the spherical rotor.

The invention contemplates the use of at least three concentric coils having their axes mutually perpendicular. The rotating mass may be of any electrically conducting mass of revolution spinning at the center of the coils. In the preferred example, a spherical rotor completely free of all markings and mechanically attached readout devices is located concentric with and within the defined coils. The conducting surface of revolution spinning at the center of the coils may be interpreted in terms of the spin reference vector. One coil which may be identified as a primary coil P is connected to an alternating voltage source. The output voltages resulting in the other two coils generally identified as the secondary coils $S_1$ and $S_2$ contain the positional information and have the same frequency as the primary excitation voltage.

The invention is particularly adaptable for use in a precise two-axis inertial angular reference gyro of minimum complexity by using orthogonally oriented coils for locating the spin reference axis of the rotating gyro.

The improved gyro represents an improvement over the basic two-degree-of-freedom, "free roto" gyros such as the electrically and/or magnetically suspended gyro or the spinning case air bearing gyro.

Further objects and advantages of the invention will be made more apparent by referring now to the accompanying drawings, wherein:

FIG. 4 illustrates a simplified diagram of a single axis electric field suspension system;

FIG. 5 is a block diagram of a single axis levitation servo;

The advantages of this invention are more readily apparent when considering the problem of reading the spin axis vector direction of a rotating sphere suspended in a high vacuum by an electric field or suspended by an air bearing. The sphere must be free of all mechanical connections and negligibly torqued. The sphere must also be unmarked electrically or optically, since markings tend to cause mass unbalance or extraneous interactions with the high intensity electrical suspension fields if suspended in an electric field. Since it is possible to readout the spin axis vector direction of any surface of revolution about the spin axis, it is possible, for example, to read the actual alignment direction and speed of rotating shafts.

This invention also gives rotational velocity magnitude and nutation. To utilize the gyro rotor positional information it is necessary to measure the spin axis direction relative to the gyro case. It is advisable not to mark the surface of the sphere as taught by the prior art since these markings cause distortion of the electric suspension fields that could produce rotor unbalance. Even if the markings do not cause appreciable drift, the high degree of precision necessary to mark the rotor so that the high performance of the gyro can be realized is eliminated. The fact that the rotor is suspended inside a vacuum for the example given further complicates the readout problem.

Figure 1:
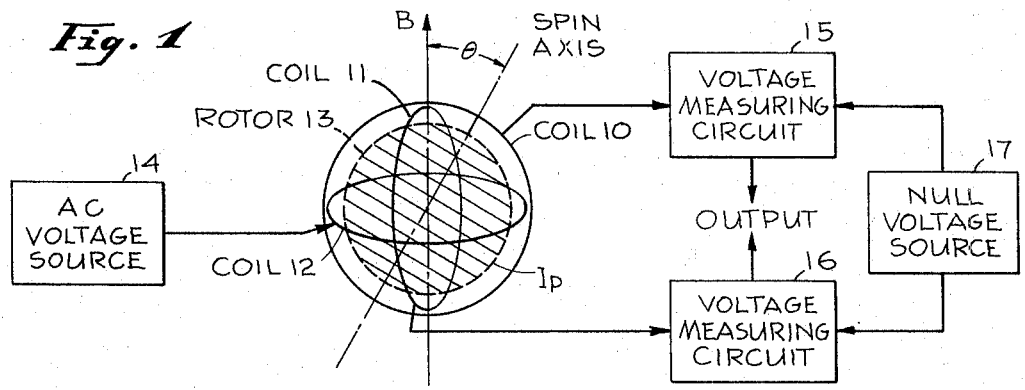
FIG. 1 is a schematic diagram illustrating the basic concepts of the invention.

Referring now to FIG. 1 there is shown an electromagnetic readout system comprising three coils 10, 11 and 12 having their axes mutually perpendicular and intersecting at the center of a spherical rotor 13. The coils 10, 11 and 12 are each represented as a single turn for ease of illustration. It will be appreciated that while the coils 10, 11 and 12 are concentric with the rotor 13 that only the rotor is within the low friction support mechanism (not illustrated). The individual coils 10, 11 and 12 may all be located outside the supports necessary to hold the rotor 13.

As will be apparent to those skilled in the art there are many ways available for rotating the rotor 13 up to speed in a low friction bearing environment. For example, by considering an electrostatic suspension environment in which the rotor 13 is supported in a hard vacuum it is possible to initially use the coils 10, 11 and 12 as follows:

(1) to spin up the gyro rotor,
(2) to measure the angular position of the rotor spin axis,
(3) to torque the rotor so as to change the direction of the rotor spin axis in inertial space, and
(4) to initially align the rotor spin vector direction.

All of these functions are accomplished with an unmarked spherical conducting rotor.

To spin up the gyro rotor, low frequency currents may be applied in quadrature to any two coils, for example coils 10 and 11. This produces a torque about an axis normal to the axis of these two coils which is used to spin up the gyro rotor 13. Once up to speed, these excitations are removed. The direction of the spin axis can be varied by applying D.C. currents simultaneously to one coil, say coil 12, and one of the other coils depending on the direction the spin axis is to be precessed. It is possible of course, to initially rotate the rotor 13 by any means available.

In accordance with the principles of this invention, a substantially low frequency A.C. voltage source having a frequence of about 50 cycles to 300 cycles is connected to coil 12. The resulting current in coil 12 induces voltages in coils 10 and 11 which vary as a function of the direction of the spin axis relative to the three orthogonal coils 10, 11 and 12. In this mode of operation, the magnetict flux generated by the excitation coil 12 generates useful circulating currents in the spinning spherical rotor 13 provided the spherical rotor spin axis is not parallel to the coil axis. These currents on the spinning sphere of the spherical rotor 13 generate a voltage producing flux that couples into coils 10 and 11. If the spin axis is aligned with the axis of the excitation coil 12, no readout currents are induced in the rotor 13, and no coupling exists between any residual rotor currents and coils 10 and 11. The voltages resulting in the other coils 10 and 11 are measured in voltage measuring circuits 15 and 16 respectively and represent the output information. The output information is considered more useful by using the device as a null seeker. For example after the spherical rotor 13 is up to speed and has a preferred spin axis a null voltage source 17 feeding voltage measuring circuits 15 and 16 is adjusted to generate an equal and opposite voltage for each circuit where the output signal from each circuit is zero.

The output voltages from coils 10 and 11 can be shown to approximate the arcsine of the two orthogonal directional angles measured from the primary coil axis direction of coil 12. A small correction term is required for accurate readout of large angles, which involves the cosines of the output angles. By interchanging the coils through lead wire connection changes and by connecting coils in series or parallel, angular displacement of 22.5 degrees in apparent coil location are achievable. With the above means, the readout angles relative to coil effective axes can be maintained below 23 degrees and the arcsine can be considered the angle itself, provided the error is split. Absolute outputs to an accuracy of approximately 2 arc minutes are therefore obtainable. The arcsine to sine correction factor may be generated for more accurate outputs, and may be generated up to 23 degrees with low precision components. The readout angles are not coplanar with the secondary coils due to the time phase lag of the current in the spherical gyro rotor relative to the initial velocity induced voltage. This lag also accounts for the required cosines mentioned above.

Figure 2:
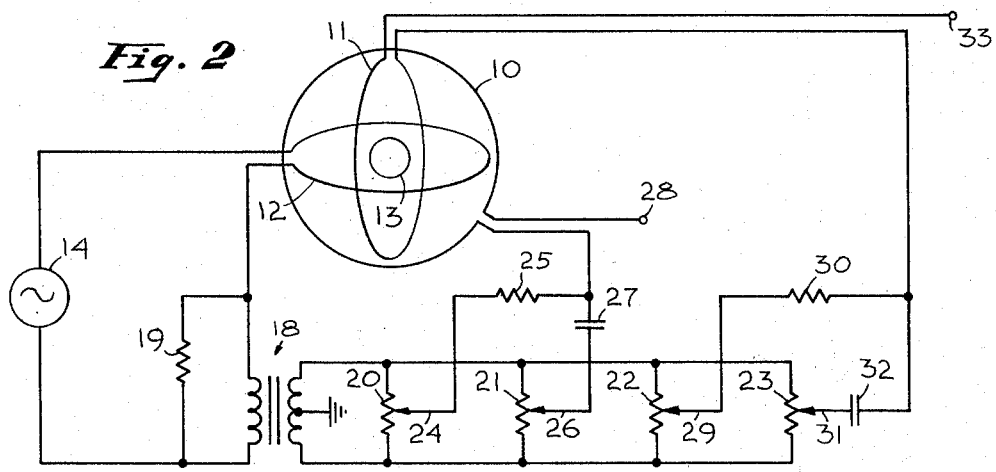
FIG. 2 is a circuit diagram illustrating a preferred mode of using this invention.

Referring now to FIG. 2 there is shown a schematic diagram more fully illustrating the circuits illustrated in FIG. 1. FIG. 2 illustrates a preferred means for exciting the coils 12 from an A.C. voltage source 14. A portion of the applied voltage from the source 14 is developed across the primary of a transformer 18 and is used as the source of the bucking voltage for nulling the output signals. A decoupling resistor 19 is connected across the primary of transformer 18 in order to isolate transformer unbalances from affecting the voltage in coil 12. The output from the transformer 18 is obtained from a conventional center tapped coil which is connected across variable resistors 20, 21, 22 and 23. A movable operating arm 24 associated with resistor 20 is connected to one end of a resistor 25, the other end of which is connected to one end of a resistor 25, the other end of which is connected to one end of the coil 10. A movable operating arm 26 associated with resistor 21 is connected to one end of a capacitor 27, the other end of which is connected to the junction of the resistor 25 and the coil 10. The free end of the coil 10 is an output terminal 28. The connections for coil 11 is obtained in a similar manner as just described for coil 10. A movable operating arm 29 associated with resistor 22 is connected to one end of a resistor 30, the other end of which is connected to one end of the coil 11. A movable operating arm 31 associated with resistor 23 is connected to one end of a capacitor 32, the other end being connected to the junction of resistor 30 and the coil 11. The free end of the coil 11 is an output terminal 33.

In operation the spin axis of the spherical rotor 13 is preferably aligned with the axis of the driving coil 12. This may be accomplished by external means such as by applying a driving voltage across coil 12 and either coil 10 or 11 and operating the rotor 13 as a conventional squirrel cage motor. Once the spherical rotor 13 is aligned and up to speed a voltage from source 14 is impressed across coil 12. Resistors 20 and 21 are adjusted until the value and phase of the bucking voltage feeding coil 10 is equal and opposite to the induced voltage which is indicated as a null at the output of terminal 28. The same procedure is followed in connection with coil 11 by adjusting resistors 22 and 23 for a null at terminal 33.

Any deviation in the voltage vector generated by coil 12 relative to the spin axis of the rotating spherical gyro rotor 13 will be indicated by a voltage and phase change at the terminals 28 and 33.

There are many variations and techniques, for example the three coils 10, 11 and 12 can be located on a three axis follow-up servo system or platform and in which the servos moved in such a direction as to keep the voltages induced in the secondary coils 10 and 11 equal to zero. In this arrangement there will be no net torque exerted on the spherical rotor 13.

As an alternative the coils may be connected to electrical resolvers in such a way that their net resultant vector magnetic direction is rotated by servos (or manual) turning the resolver shafts; hence eliminating the above platform.

In an effort to improve accuracies and keep the angles less than 22 degrees in order that the measured voltages indicate the angles and not the sine of the angle it is proposed to add two additional coils at the intersections of each pair of the original coils and perpendicular to the other coil, making a total of 9 coils. By switching coil connections and changing which coils are primary and active secondaries, the output angles can be kept less than 12 degrees, with resulting increases in accuracy, correction factor generation and reduced loading torques. It can also be shown that apparent coils are produced midway between connected coils if the two connected coils are either in series or parallel. This technique may require locating the two direction angles from different coil references resulting in scale factor changes.

Improved accuracy is possible for these applications not requiring continuous readout by controlling the on time and hence the duty cycle. At any given time the error angles are not zero which results in a torque on the rotor. This torque may be reduced by operating coil 12 at the lowest possible level of primary excitation. If primary excitation is pulsed to reduce the duty cycle, larger magnitudes of excitation may be used and a better signal to noise ratio relative to angle detection may be achieved.

Figure 3:
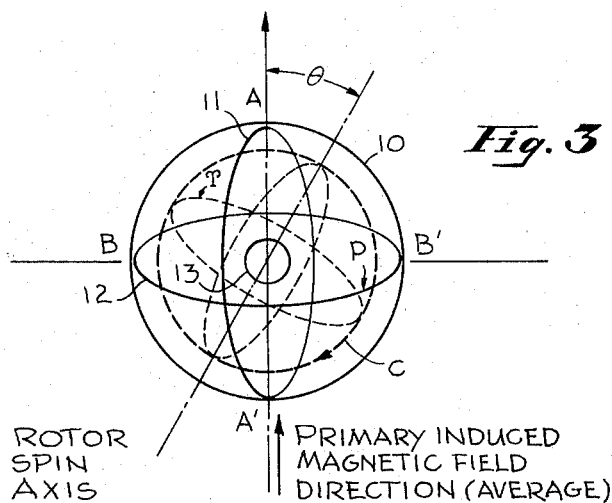
FIG. 3 illustrates the voltages induced in the fixed coils by the spinning rotor.

Referring now to FIG. 3 there is shown a diagram of the coils 10, 11 and 12 and the spinning spherical rotor 13.

If one makes the assumption that spin and excitation angular velocities are low compared to the finite resistivity of the spherical rotor 13, the output voltages are produced as follows. The primary coil 12 induces an alternating direction with time magnetic field parallel to the AA' axis. If a closed loop in a great circle plane of the spherical rotor 13 which is also parallel to the spin axis is considered, it will be observed that the time rate of change of flux passing through the loop is finite and maximum when the plane is parallel to the AA' and BB'. (It is assumed that $m$ lies in the plane parallel to AA' and BB'.) The changing flux induces current throughout the sphere which tends to act like a net current flowing around the spherical center and in a plane parallel to AA' and BB'. This current is alternating and it induces a changing magnetic field with time that stands still in space and which passes through coil 10. Coil 10 then has a voltage induced in it that is the excitation frequency, and its magnitude is proportional to the sine of angle $\theta$ and to the rotor angular velocity. If angle $\theta$ lies outside of plane AA', BB', current is induced correspondingly in coil 11 also. The current induced in the rotor 13 contains the sum and difference frequencies of the spin and excitation angular velocities. At higher frequencies or lower rotor resistivities coils 10 and 11 have to be rotated about AA' to produce correct readings. There is also a net effective current produced that lies in the plane of the primary coil 12, and which goes around the spherical center. This current has a negligible effect at low frequencies, except for heating and partial cancellation of the primary induced magnetic field. This current is produced even if the rotor is not spinning.

The use of the induction readout system makes possible the more important feature of this invention, namely, the use of a gyro rotor of approximately spherical symmetry. The rotor may consist, in other words, of a uniform, solid sphere without any internal shaping or hollowing or any composite structure that would normally be required for achieving a maximum moment of inertia about the desired spin axis. Additionally, no special markings are required on the rotor for readout purposes. Therefore, all fabrication efforts may be directed toward making a perfect spherical surface and statically balancing the sphere about its geometric center.

It must be recognized, of course, that the sphere in actuality will have a principal axis of maximum moment of inertia and that, except in the isolated event of rotation about this axis, the rotor will in general undergo rather large nutational motions. The nutation of the spin vector in space, however, will be small (of the order of the ratios of the maximum and minimum rotor moments of inertia) and will occur at frequencies approximately equal to the spin frequency. The nutation will modulate the pick-off signal, but due to its small magnitude and high frequency this modulation may readily be filtered. The average pick-off signal thus gives essentially the direction of the angular momentum vector, which is the desired output. The fact that the spin vector may precess through large angles relative to the rotor body coordinates is of no consequence, since the pick-off measures only the instantaneous spin axis of the rotor. Additionally, the specific orientation of the rotor is unimportant, the spin velocity may be imparted about any axis. Since there is no preferred spin axis, no special provisions need be employed during spin-up to align the spin vector with the preferred body axis, that is, there is no requirement to damp out rotor nutation.

The defined magnetic readout system when used with a spherical gyro is particularly adapted for use with Electrically Suspended Gyro (ESG). This combination provides a simple means of improved readout in an ESG device that presently requires complex optical and associated equipment. The ESG consists of an electrically conducting spherical rotor suspended in high vacuum by electrical fields produced by an array of electrodes surrounding the rotor. There is no physical contact with the rotor; initial rotation is imparted by induction motor action of a rotating magnetic field produced by coils surrounding the rotor. Initial alignment of the rotor spin vector is produced by a steady magnetic field that may be either A.C. or D.C., and which field is parallel to the desired spin direction. During use, these magnetic fields are turned off, and the rotor coasts. With a reasonably high vacuum, run down time constant is measured in years.

The operation of the electrical suspension is based on two facts. First, an electrical field terminating on a conductor produces an attractive force equal to $$\frac{\epsilon}{2}E^2$$

per unit area, where E is the electrical field strength and $\epsilon$ is the capacitivity of the medium outside the conductor. Second, for a perfect conductor, the electrical field and the resultant electrical force is normal to the surface of the conductor. Electrode configurations and suitable electrical circuits are employed to produce fields of different intensities around the rotor, such that the resultant force is just sufficient to suspend the rotor within electrode structure. It may be seen that static voltages will not meet this requirement, since a small displacement of the rotor causes a change in field strength such as to increase the force in the direction of the displacement. Thus, static electrical suspension is inherently unstable requiring a feedback system to produce stability.

Two general techniques are employed to stabilize the suspension system. The first is a conventional feedback servo employing capacitive displacement pick-offs to measure rotor translation, an amplifier, shaping or damping networks and a power amplifier to apply corrective voltages to the electrodes. The second technique is a resonant or "passive" suspension in which the electrode capacitance is resonated with an external inductor. This series resonant circuit is excited at a frequency slightly above the normal resonance frequency so that translation of the rotor and the resultant change in capacity causes a change in electrode voltage tending to return the rotor toward its normal position. The disadvantages of this system are that it cannot be made as stiff as the active feedback servo and that it is difficult to incorporate adequate damping for translational oscillations of the rotor.

The usefulness of the electrical suspension principle is important because it is frictionless, and to a first approximation it exerts no torque on a spherical surface since all force vectors pass through the center of the sphere.

This latter factor applies for any distribution of forces. The degree to which the rotor can be made and maintained spherical is therefore the principal factor affecting gyro performance.

Angular readout of the ESG is conventionally obtained by optical techniques involving various types of markings on the rotor. The application of the marks, however, causes distortion of the rotor surface and, in general, the marks must be rather precisely aligned with the rotor spin axis. It is also necessary that the rotor spin in a stable manner about a well-defined axis in order that the position of the marks, as seen by the optical system, is stable, and within the field of view of the sensing devices.

Referring now to FIG. 4, there is shown a simplified diagram of a single dimensional suspension system which illustrates the electrical suspension technique. This test model illustrated demonstrated adequate force and servoing capability to properly suspend a gyro rotor. The movable element 40 is suspended by wires 41 which allow freedom of motion along an axis parallel to the vector "f" only. In this drawing, "f" represents the acceleration forces that may act on the movable element 40. Constraint along the acceleration axis is accomplished with the electric suspension system. On opposite sides of the movable element 40 are electrodes 42 and 43. The translational position of the movable element 40, which simulates the gyro rotor, gives rise to a variation of the electrical capacitance between the electrodes 42 and 43 and the movable element 40. The capacitance change is detected by electronic circuitry 44 which causes the electrical potentials of the electrodes 42 and 43 to change in such a way that a net force is exerted on the movable element 40 tending to restore it to a position midway between the electrodes. In effect, the movable element 40 is servoed between the electrodes 42 and 43.

Figure 6:
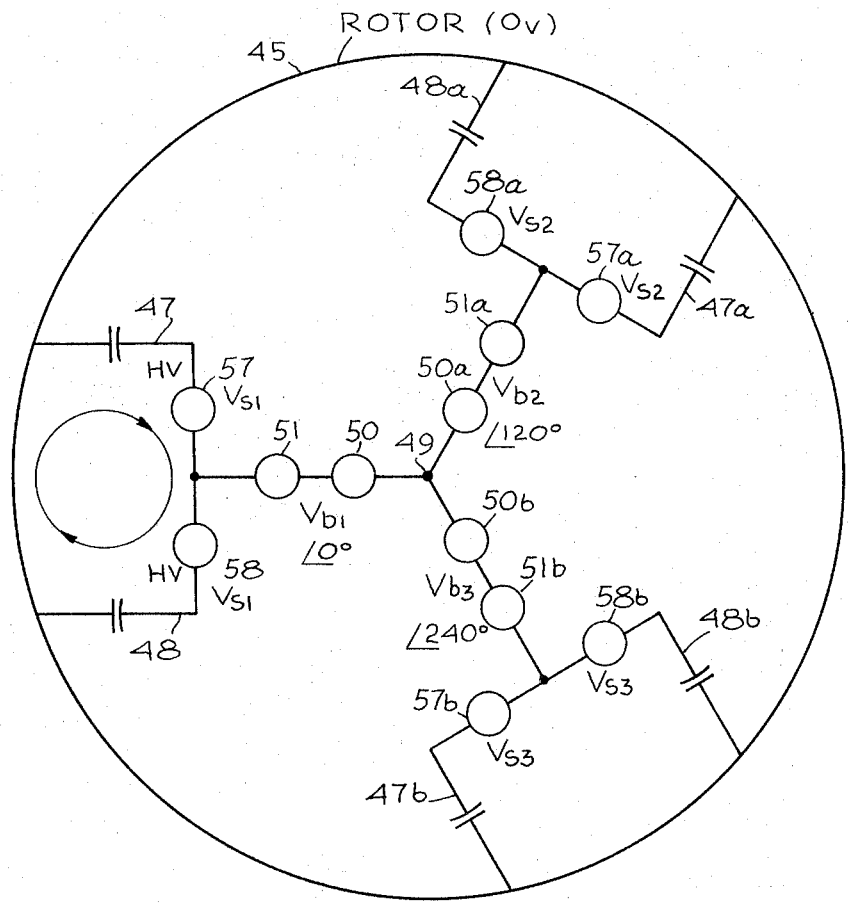
FIG. 6 illustrates a three axis levitation system.

Referring now to FIG. 5 there is shown a block diagram illustrating a preferred embodiment of one axis of a levitation system for supporting the spherical gyro rotor by electrostatic suspension means. The rotor 45 is located within an evacuated area that for earth applications may consist of a hard vacuum area 46 created by conventional pumping means. For space applications the gyro rotor can be exposed to the vacuum of outer space thereby simplifying the location and lubricating problems. In the earth's atmosphere the rotor 45 is located within the evacuated chamber 46 having a pair of electrodes 47 and 48 for each axis projecting through the chamber. For a complete three axis system there would be required six electrodes for levitating the rotor 45 and in which the electrodes of the other two axes are represented by an electrode 49 for electrically neutralizing any resulting voltage on the rotor 45. Electrical contact with the electrodes through the evacuated chamber 46 is obtained by means of conventional feed through connectors properly located and sealed. FIG. 5 illustrates the necessary circuitry for detecting positional changes and generating correction voltages for only a single axis. A complete implementation for a three axis levitation system would include three similar systems illustrated in FIG. 5 and connected as illustrated in FIG. 6.

The levitation system comprises a position locating means using a 45 kc. reference voltage and a correction force voltage operating at 90 kc. The choice of reference voltages is arbitrary since any two different frequency voltages may be used. The position locating voltage is generated by a 45 kc. voltage source 50 which feeds and modulates a 90 kc. voltage source 51. The output of source 51 includes a 45 kc. voltage and a 90 kc. voltage which pass through a high voltage protection circuit 52. The protection circuit 52 is desirable in view of the substantially high voltages used in the correction and positioning circuits and is used primarily to detect arc-overs that may occur and to open the circuit until the arc clears the system. The 45 kc. and 90 kc. signals from the protection circuit 52 are amplified in a power amplifier 53 which feeds a center tap connection 54 of a primary coil 55 in an error signal transformer 56 and electrode 49 in opposing phase relationship. The opposite ends of coil 55 are individually connected to separate high voltage secondary coils 57 and 58 associated with transformer 59. One end of coil 57 is connected to electrode 47 and one end of coil 58 is connected to the opposite electrode 48. The phasing of coils 57 and 58 is selected so that a 45 kc. current signal flowing through the center tap 54 and coils 57 and 58 will produce opposing flux in each half of coil 55. A secondary coil 60 associated with transformer 56 is grounded to complete a circuit to amplifier 53 and at the other end to a substantially low voltage secondary coil 61 associated with transformer 59.

If we assume the spherical gyro 45 is prefectly aligned between electrodes 47 and 48 then the signal path from amplifier 53 through coil 55 and coils 57 and 58 will produce equal and opposite flux conditions in coil 55 resulting in a zero error signal at the secondary coil 60. For the balanced condition both the 45 kc. signal and the 90 kc. signal will be balanced out in the secondary coil 60. Since there is no direct connection to the rotor 45 in a three axis system, it is necessary that the capacity between the defined ground electrode 49 and the rotor be equal to the sum of the capacity between the electrode 47 and the rotor, and the electrode 48 and the rotor. In this manner both circuits including electrodes 47 and 48 will be balanced and equal so that voltages induced in the rotor will be equal and opposite and thereby balance each other out. In the preferred embodiment a 45 kc. detection voltage of approximately 300 volts was developed between each electrode and the rotor 45.

The reason for the 90 kc. signal also being fed to the primary coil 55 of the error transformer 56 will be made more apparent by considering the effect of a change in the position of the rotor 45 with respect to electrodes 47 and 48.

A displacement of the rotor 45 will change the capacity between the rotor and each of the electrodes 47 and 48 depending of course on the direction of the change. The current flowing in each half of the primary coil 55 will no longer be equal thereby resulting in an output error signal being induced in the secondary coil 60. The resulting error signal will consist of a 45 kc. signal and a 90 kc. signal fed through coil 61 to a tuned position amplifier 62 which is tuned to 45 kc. for blocking the 90 kc. signal. The amplified 45 kc. signal is detected in a demodulator 63 by comparing the incoming 45 kc. signal with the same 45 kc. signal generated in source 50 and in the same phase relationship. The output of the demodulator 63 is a substantially D.C. signal that is fed to a compensation network 64 which provides a damping correction to the D.C. error signal. The compensated error signal is fed to a modulator 65 for generating a correction signal at 90 kc. This is accomplished by feeding the modulator 65 with the same 90 kc. signal generated by source 51 and in the same phase relationship. The 90 kc. correction signal is fed through a high voltage protection circuit 66, which is similar to circuit 52 and then to a power amplifier 67 tuned to 90 kc. In the preferred embodiment power amplifier 67 was of the order of 100 to 200 watts whereas tuned amplifier 62 was of the order of one milliwatt. The output of amplifier 67 drives a substantially low impedance primary coil 68 of transformer 59 which is sufficient to generate substantially high voltages in secondary coils 57 and 58. The application of the 90 kc. correction voltages induced in coils 57 and 58 to the individual electrodes 47 and 48 is determined by the algebraic combining of the induced 90 kc. signals with the bias 90 kc. fed from amplifier 53 to the center tap 54 on primary coil 55. The phased connection of the coils 57 and 58 will provide the proper output voltages between the electrode 47 and the rotor 45 and the electrode 48 and the rotor that are in direct proportion to the displacement of the rotor to thereby generate an electrostatic force, opposing the original displacement. The resulting 90 kc. correction voltages which appear at electrodes 47 and 48, and at terminals 70 and 71 are also indicative of acceleration forces on the rotor 45. In other words, the system as illustrated may be used as an accelerometer having either a single, two or three degrees of freedom.

In the preferred embodiment full displacement of the rotor 45 under a force two times gravity was capable of generating a maximum voltage of 3,540 volts at 90 kc. in one coil and zero voltage in the other of coils 57 and 58. The induced high voltages in coils 57 and 58 cause a substantially high 90 kc. current to flow through primary coil 55 of transformer 56 resulting in a 90 kc. voltage in the secondary coil 60. Coil 60 is in series with secondary coil 61 in order to buck out the 90 kc. voltages in the error signal line feeding the tuned amplifier 62. It will be remembered that the tuned amplifier 62 is tuned to 45 kc. which is used as the rotor position detection signal. In order to insure that no voltages are induced in the rotor 45 the phase of the voltages from amplifier 53 to center tap 54 and electrode 49 are 180 degrees out of phase. It is for this reason that both a 90 kc. voltage and a 45 kc. voltage are fed into the center tap 54 of coil 55. The servo action between the position locating 45 kc. signal and the correction of forcer 90 kc. voltage is continuous in order to maintain the rotor 45 properly positioned.

Referring now to FIG. 6 there is shown a schematic diagram using three single axis levitation servos connected to form a three axis levitation system. FIG. 6 also illustrates graphically the three phase connection necessary to eliminate any resulting 45 kc. and 90 kc. signal from being induced in the rotor 45. Each of the three individual phases illustrated in FIG. 5 are 120 degrees apart.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
at least three electrically energized readout coils having mutually perpendicular axes, and
a rotating spherical mass having no preferred moment of inertia spinning about the center of said coils, the voltage output of said readout coils being indicative of the position of said rotating mass, said mass having electrically conducting portions, said coils completely encircling said sphere.

2. In combination,
at least three electrically energized readout orthogonally oriented coils having a fixed center, and
a solid spherical rotating mass having no preferred moment of inertia spinning about said center, the voltage output of said readout coils being indicative of the position of said rotating mass, said coils completely encircling said sphere.

3. In combination,
at least three electrically energized readout coils having mutually perpendicular intersecting axes at a fixed center, and
a solid spherical rotating mass having an electrically conducting surface of revolution spinning about said center, the voltage output of said readout coils being indicative of the position of said rotating mass, said mass having no preferred moment of inertia, said coils completely encircling said sphere.

4. In combination,
a first, second and third coil orthogonally oriented with respect to each other for defining a fixed center,
means for generating an alternating potential across said first coil,
an isoinertia spherical rotating mass having an electrically conducting surface spinning at said center, and
means for measuring induced voltages in said second and third coils as a measure of the position of the inertial spin reference axis of said rotating mass.

5. In combination,
at least three electrically energized readout concentric coils having mutually perpendicular axes,
an isoinertia spherical rotating mass having an electrically conducting surface spinning about the center of said coils, the voltage output of said readout coils being indicative of the position of said rotating mass,
and means for electrically suspending said rotating mass within a substantially high vacuum thereby reducing friction losses.

6. In combination,
at least three electrically energized readout concentric coils having mutually perpendicular axes, and
a rotating spherical mass having no preferred moment of inertia concentric with said coils rotating about the center of said coils, the voltage output of said readout coils being indicative of the position of said rotating mass,
and means having substantially no friction for supporting said rotating mass, said coils completely encircling said sphere.

7. In combination,
at least three concentric coils having mutually perpendicular axes,
means for generating an alternating potential across one of said coils,
an isoinertia spherical rotating mass having an electrically conducting surface spinning about the center of said coils,
means for measuring induced voltages in said other coils as a measure of the change in the spin reference axis of said rotating mass,
and electrical levitation means for supporting said rotating mass within a substantially high vacuum environment.

8. A combination, according to claim 7, in which said rotating mass is concentric with and within said concentric coils.

9. A combination, according to claim 7, in which said concentric coils are external to said vacuum environment.

10. In combination,
a substantially frictionless spinning isoinertial spherical mass having electrically conducting portions,
means comprising an input coil and alternating voltage source for generating a magnetic field in flux linking relationship with said spinning mass and having a direction determined by the perpendicular axis of said input coil,
means comprising a plurality of output coils in flux linking relationship with said spinning mass for providing output signals indicative of positional changes between the axis of said input coil and the initial spin axis of said mass, and substantially low friction electrical levitation means for supporting said spinning mass.

11. A combination, according to claim 10, in which said input coil and said output coils are concentric with said spinning mass and external to said levitation means.

12. A combination, according to claim 10, in which the axes of said input coil and said output coils are mutually perpendicular and intersect at a point, and said spinning mass is spinning about said point.

(References on following page)

References Cited by the Examiner

UNITED STATES PATENTS

| | | | |
|---|---|---|---|
| 2,691,306 | 10/1954 | Beams et al. | 74—5.6 |
| 2,785,573 | 3/1957 | Bentley | 74—5.6 X |
| 2,919,583 | 1/1960 | Parker | 74—5 |
| 2,942,479 | 6/1960 | Hollmann | 74—5.6 |
| 3,105,657 | 10/1963 | Mueller et al. | 74—5.7 X |
| 3,107,540 | 10/1963 | Curriston | 74—5.7 X |
| 3,115,784 | 12/1963 | Parker | 74—5.1 |

FRED C. MATTERN, JR., *Primary Examiner.*

BROUGHTON DURHAM, *Examiner.*

T. W. SHEAR, *Assistant Examiner.*